(12) United States Patent
Hurst

(10) Patent No.: US 9,559,847 B2
(45) Date of Patent: Jan. 31, 2017

(54) CONTENT ACCESS FOR DURATION OF CALENDAR EVENTS

(71) Applicant: AirWatch, LLC, Atlanta, GA (US)

(72) Inventor: Evan Hurst, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 14/339,659

(22) Filed: Jul. 24, 2014

(65) Prior Publication Data

US 2016/0026776 A1   Jan. 28, 2016

(51) Int. Cl.
| | | |
|---|---|---|
| *G06F 21/00* | (2013.01) | |
| *H04L 9/30* | (2006.01) | |
| *G06F 21/60* | (2013.01) | |
| *H04L 9/08* | (2006.01) | |
| *G06F 21/62* | (2013.01) | |
| *G06Q 99/00* | (2006.01) | |

(52) U.S. Cl.
CPC .............. *H04L 9/30* (2013.01); *G06F 21/602* (2013.01); *G06F 21/6209* (2013.01); *G06Q 99/00* (2013.01); *H04L 9/0819* (2013.01); *H04L 9/0861* (2013.01); *G06F 2221/2137* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 2002/0143900 | A1* | 10/2002 | Kenner | G06Q 30/02 709/219 |
| 2003/0014651 | A1* | 1/2003 | Strobel | G06F 21/608 713/189 |
| 2007/0150502 | A1* | 6/2007 | Bloebaum | G06F 17/30861 |
| 2009/0257596 | A1* | 10/2009 | Piccinini | G06F 21/6209 380/279 |
| 2010/0023974 | A1* | 1/2010 | Shiragaki | H04N 21/2402 725/58 |
| 2012/0150956 | A1* | 6/2012 | Tucker | H04L 65/1069 709/204 |
| 2013/0145426 | A1* | 6/2013 | Wright | H04L 63/10 726/3 |
| 2014/0223533 | A1* | 8/2014 | Vitali | H04L 63/08 726/7 |
| 2015/0143468 | A1* | 5/2015 | Hebert | H04L 63/06 726/4 |

* cited by examiner

*Primary Examiner* — Morshed Mehedi

(57) ABSTRACT

Content access for the duration of a calendar event may be provided. Upon receiving a calendar invitation comprising a start time, an end time, and an encrypted attachment, a user may accept or reject the calendar invitation. If the calendar invitation is accepted, an acceptance notification associated with the calendar invitation may be transmitted. Upon receiving a request to access the encrypted attachment, a determination as to whether the request to access the encrypted attachment occurs within the start time and the end time of the calendar invitation may be made. If the request to access the encrypted attachment does not occur within the start time and the end time of the calendar invitation, access to the encrypted attachment may be refused.

20 Claims, 5 Drawing Sheets

CONTENT ACCESS FOR DURATION OF CALENDAR EVENTS

BACKGROUND

Limited duration access to content may be provided. In some situations, highly confidential information may need to be distributed to meeting attendees in advance of the meeting's occurrence. For example, an extremely large multimedia file may be intended for presentation at a company's board meeting, which some attendees will attend via teleconference. It may be impractical to wait until the start of the meeting to begin downloading the presentation, as such a transmission may take a long time. Conventional solutions must do just this, however, or else risk early release of the information if access to the content is granted early.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
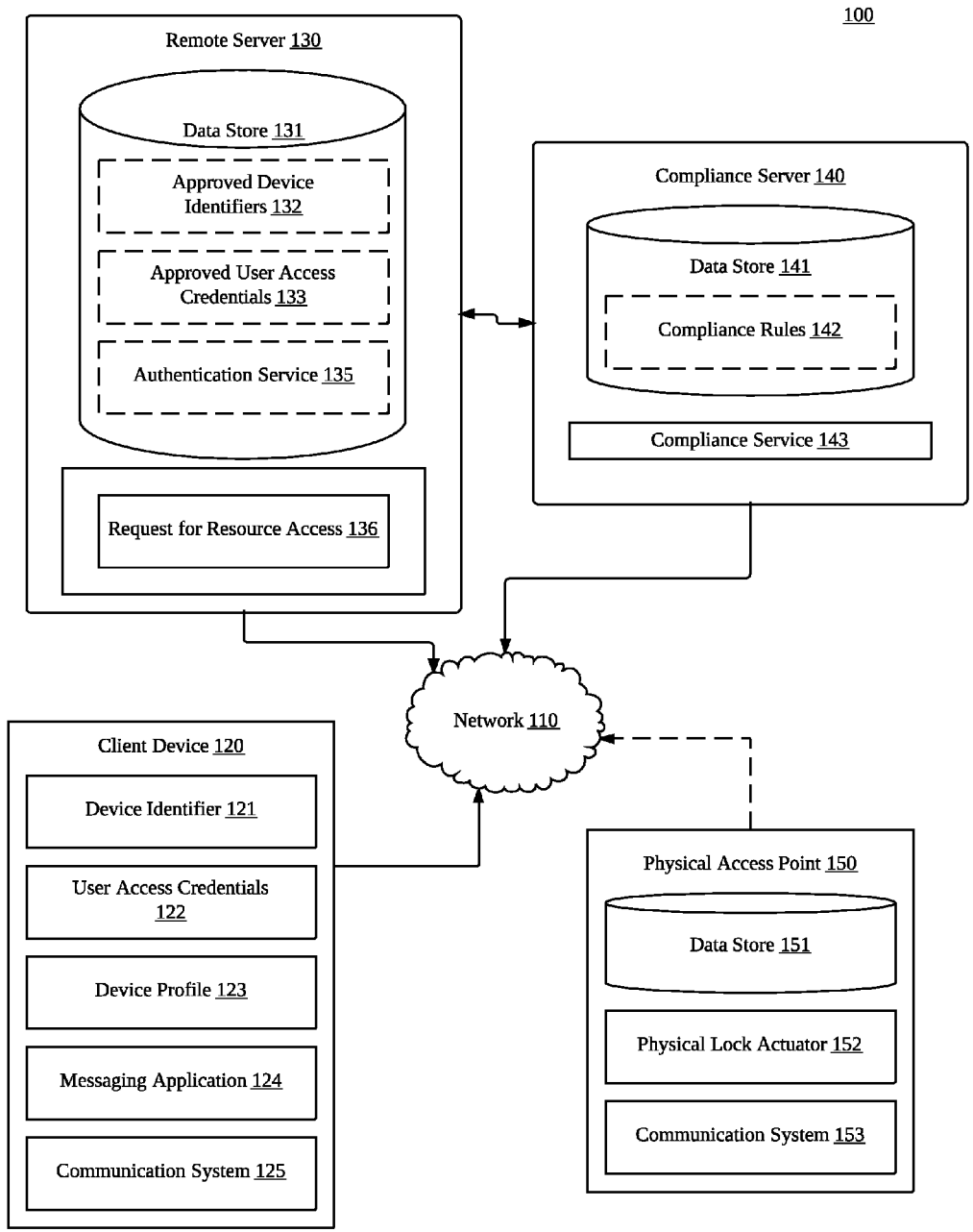
FIG. 1 is a block diagram of an operating environment for providing device management.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Limited duration access to content may be provided. In one example use case, a meeting organizer may create a calendar event using a common scheduling application and invite several others to attend. The organizer may attach documents, links, and/or other content to the meeting event that may comprise confidential information. By using an encryption key pair, the content may be encrypted according to a public key (that may or may not be distributed to the attendees of the meeting) before being distributed. In some embodiments, the encrypted content may only be distributed to an attendee after they have accepted the meeting invitation.

At a predetermined time, which may be at the time the meeting starts or some set period beforehand, the encrypted content may be decrypted. For example, the private key may be distributed to the attending users, or a remote server may decrypt the content after determining that the attending users' devices are compliant with management or security policies. The decrypted documents may then be viewed normally and/or via particular applications, such as a secure web browser or document viewer. After the meeting, the content may be securely deleted and/or may be retained by the attendees according to settings chosen by the meeting organizer.

In some embodiments, additional content may be distributed or updated prior to the meeting. For example, other attendees may distribute content to each other using the same public key such that all the encrypted documents may be decrypted at the same time. One possible use case for such a scenario may be a bid process where each attendee submits an encrypted bid, and all bids are decrypted simultaneously. The private key may be stored by a key service and only released at the appropriate time so that no one, not even the organizer, may decrypt the content prior to the set time.

In some embodiments, users, applications, and/or their devices may be required to comply with management and/or security policies in order to decrypt the attachments, request resources, use certain features and/or to communicate with other users at all. For example, a device may need to comply with various security checks such as virus or malware scans, which applications and/or protocols may be used, operating system integrity (e.g., not be 'rooted', 'jailbroken', or otherwise hacked), and/or user, group, and/or device authorizations. Management policies may restrict factors such as times and/or locations in which such messages may be sent and/or received, a quota of resources that may be used by such messaging, who may exchange messages with whom, and/or which user preferences and/or settings may be enforceable.

Compliance with management and/or security policies may be required by an enterprise to prevent remediation actions from being taken. For example, a management policy may require that a device have a passcode set, that a specific application be used for real-time communications, and that only users within the same user group may be messaged during working hours. Security policies may restrict encryption of the message traffic to an encryption key assigned by the enterprise, so that messages may be logged and/or audited, and may prohibit the sending of files or images. Failure to comply with these policies may result, for example, in restricting an input from being transmitted at all, overriding a user preference associated with the application (e.g., using the enterprise encryption key instead of a personal key), and/or preventing the establishment of a communication session between the users at all.

The security policies may further comprise requirements to protect the content of the communication from unauthorized users. For example, a notification message on the receiving user's device may be prohibited from displaying any and/or all of the contents of the communication until an authorization, such as a passcode or encryption key password, has been entered. In some embodiments, the message may be displayed, but the contents may be obfuscated, such as by blurring or covering text with black boxes. Other restrictions may prevent any and/or all devices participating in the communication from capturing the contents of the message, such as by preventing logging and/or disabling screen capture capabilities. A further refinement may vary a refresh rate associated with different portions of a display of the contents such that attempts to photograph the screen may be blocked or at least allowed to capture only portions of those contents.

The technical effects of some embodiments of this disclosure may include establishing control of access to networks and resources for user devices when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 illustrates a networked environment 100 according to various embodiments. The networked environment 100 includes a network 110, a client device 120, a remote server 130, and a compliance server 140. The network 110 comprises, for example any type of wireless network such as a wireless local area network (WLAN), a wireless wide area network (WWAN), and/or any other type of wireless network now known and/or later developed. Additionally, the network 110 may comprise the Internet, intranets, extranets, microwave networks, satellite communications, cellular systems, PCS, infrared communications, global area networks, and/or other suitable networks, etc., and/or any combination of two or more such networks. It should be understood that embodiments described herein may be used to advantage in any type or combination of wired and/or wireless networks.

In some embodiments, the network 110 facilitates the transport of data between at least one client device, such as client device 120, the remote server 130, and the compliance server 140. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, New-Card, Cardbus, a modem, a wireless radio transceiver (including an RFID transceiver), near-field communications (NFC) transceiver, and/or the like. Additionally, the client device 120 may include a processor for executing applications and/or services, and a memory accessible by the processor to store data and other information. The client device 120 is operable to communicate wirelessly with the remote server 130 and the compliance server 140 with the aid of the wireless network connectivity component.

Additionally, the client device 120 may store in memory an agent app 122, a device profile 124, user access credentials 126, and potentially other data and/or applications. In some embodiments, the device profile 124 may include a software identifier, a hardware identifier, and/or a combination of software and hardware identifiers. For instance, the device identifier may be a unique hardware identifier such as a MAC address, a CPU ID, and/or other hardware identifiers. The user access credentials 126 may include a username, a password, and/or biometric data related to facial recognition, retina recognition, fingerprint recognition, and the like. Additionally, the device profile 124 may include a listing of hardware and software attributes that describe the client device 120. For instance, the device profile 124 may include hardware specifications of the client device 120, version information of various software installed on the client device 120, and/or any other hardware/software attributes. Additionally, the device profile 124 may also include data indicating a date of last virus scan, a date of last access by IT, a date of last tune-up by IT, and/or any other data indicating a date of last device check.

The client device 120 may further be configured to execute various applications such as the agent application 122. The agent application 122 may be executed to exchange information with other servers and/or devices via network 110. In some embodiments, agent application 122 may collect information about the status of client device 120 as well as receive and/or enforce compliance rules 142 from compliance server 140.

The client device 120 may also be configured to execute other applications such as, for example, browser applications, email applications, physical access applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store that is part of and/or otherwise accessible to the remote server 130 and/or that is part of and/or otherwise accessible to the compliance server 140. The data stored in each of the data stores may be accessed, modified, removed, and/or otherwise manipulated in association with the operation of the applications and/or functional entities described herein.

The components executed in the remote server 130 may include an authentication service 132, and may include other applications, services, processes, systems, engines, and/or functionality not discussed in detail herein. As used herein, the term "authentication service" is meant to generally refer to computer-executable instructions for performing the functionality described herein for authorizing and authenticating client device 120. The authentication service 132 is executed to receive a request for access to resources 136 from an application executed on client device 120 and to determine whether to grant or deny the request. Upon determining to grant the request 136, the authentication service 132 may then send access credentials.

The data stored in the data store of the remote server 130 may include, for example, approved device identifiers, approved user access credentials, physical access credentials, resource access credentials, and potentially other data. The approved device identifiers represents a listing of device identifiers that have been pre-approved for potential accessing physical access credentials which may entitle holders of client devices 120 to access to various resources. The approved device identifiers may have been previously provided to the remote server 130 by a system administrator and/or the like. The approved user access credentials represent a listing of user access credentials that have been pre-approved for potential accessing resource credentials.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as client device 120. The compliance service 143 is executed to determine whether the device characteristics of the client device 120 comply with the compliance rules 142 that are stored in the data store. For instance, the compliance service 143 may identify the device characteristics from the device profile 124 of each client device 120. Additionally, the compliance rules 142 represents a listing of management and security policies, hardware restrictions, software restrictions, and/or mobile device management restrictions that may need to be satisfied by the client device 120 prior to granting the request for access to resource(s) 136.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given resource(s). In some embodiments, however, the compliance service 143 may not be used and physical access authorization may be determined solely based on approved user access credentials and/or approved device identifiers.

A user operating a client device 120 may wish to receive at least one resource(s) so that the user may physical access a building, location, door, gate, drawer, filing cabinet, storage unit, cabinet, etc. In some embodiments, the user may interact with an input device to manipulate a network page displayed by a locally executed application, such as a browser application, to generate the request for access to resource(s) 136. In some embodiments, the user may manipulate a user interface generated by a locally executed application to generate the request. In either case, the user may provide login information and/or the application may automatically retrieve the login information from the memory of the client device 120. Login information may be, for instance, a unique user name, a password, biometric data, and/or other types of user access credentials 126. The application may then communicate the request to the enterprise access application, which may generate and transmit the request to the authentication service 132. In some embodiments, the enterprise access application may itself receive the input from the user directly and then transmit the access request to the remote server 130.

Upon receiving the request, the authentication service 132 determines whether to grant or deny the request. In some embodiments, the authentication service 132 may first authenticate the client device 120 and the user operating the client device 120. To this end, the authentication service 132 determines whether the device identifier associated with the client device 120 matches one of the identifiers listed in the listing of approved identifiers. For instance, the device identifier of the client device 120 may be included as part of the request transmitted by the enterprise access application. In some embodiments, the authentication service 132 may request the device identifier from the client device 120 in response to receiving the access request. Upon identifying and/or receiving the device identifier, the authentication service 132 determines whether the device identifier matches one of the approved identifiers stored in the data store. In some embodiments, the authentication service 132 may authenticate the client device 120 dynamically by determining whether the device identifier is within a predetermined range of approved device identifiers. In some embodiments, the authentication service 132 may authenticate the client device 120 dynamically by performing an algorithm on the device identifier.

Additionally, the authentication service 135 may also authenticate the user operating the client device 120 by determining whether the user access credentials 126 associated with the user match one of the credentials in the listing of approved user access credentials. For instance, the user access credentials 126 associated with the user on the client device 120 may be included as part of the access request 136 transmitted by the enterprise access application 124. In some embodiments, the authentication service 132 may request the user access credentials 126 from the client device 120 in response to receiving the access request. Upon identifying and/or requesting the user access credentials 126, the authentication service 135 may determine whether the user access credentials 126 matches one of the approved user access credentials stored in the data store. In some embodiments, the authentication service 132 may authenticate the user operating the client device 120 without also authenticating the client device 120. In other words, certain authenticated users may be authorized to gain the requested physical access regardless of what device they used to submit the resource request.

In some embodiments, having authenticated the client device 120 and the user operating the client device 120 as authorized to receive the resource(s), the authentication service 132 communicates with the compliance service 143 to further authorize the client device 120 to receive the resource(s). In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 124. All or part of the device profile 124 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 132. In an alternative embodiment, the authentication service 132 may include and perform functionality for determining whether the client device 120 complies with the compliance rules 143.

If the authentication service 132 determines and/or receives a determination that the client device 120 is authorized, the authentication service 135 then associates the client device 120 with at least one resource(s). In some embodiments, the authentication service 132 sends the physical access credentials to the client device 120 and authorizes the client device 120 to use such credentials in connection with accessing physical access points. In some embodiments, the authentication service 132 may also send the physical access credentials to physical access point.

In some embodiments, the resource(s) may be revoked at any time by the remote server 130. Revocation may occur for any number of reasons, including but not limited to, a change in device profile 124, a change in approved device identifiers, a change in approved user access credentials, expiration of a defined time period, and/or a request from the user of the client device 120.

Figure 2:
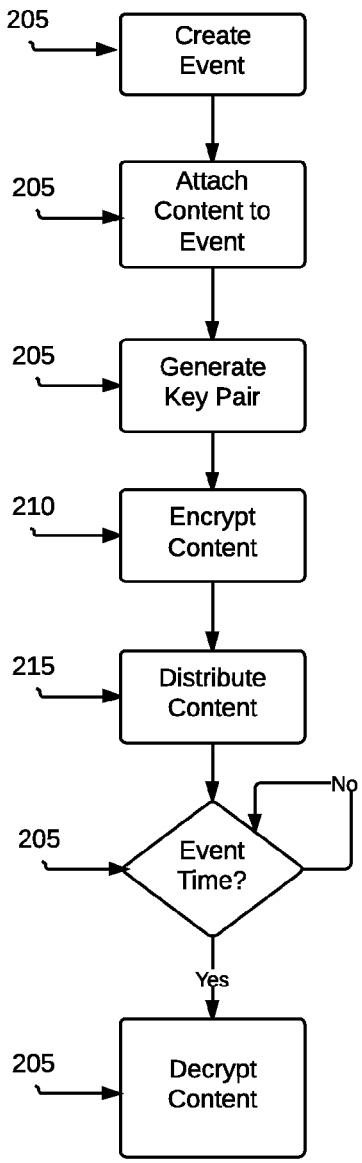
FIG. 2 is a flow chart illustrating a method for providing a limited duration content access.

FIG. 2 is a flow chart setting forth the general stages involved in a method 200 consistent with embodiments of this disclosure for providing limited duration content access. Method 200 may be implemented using elements of operating environment 100 as described above, an example use case deployment 300, a schematic block diagram 400 and a virtual desktop infrastructure (VDI) system 500, as described below. Method 200 is described below with respect to operations performed by a computing device, with the understanding that such a computing device may comprise any number devices programmed for operation of any and/or all of the steps of method 200. The described computing device may comprise, for example, client device 120, remote server 130, compliance server 140, and/or physical access point 150. Ways to implement the stages of method 200 will be described in greater detail below.

Method 200 may begin at stage 205 where a computing device may create an event. For example, a user of a typical calendaring application may create a calendar event with a defined start and/or end time. It should be appreciated that numerous applications and ways exist to define a time period for an event and that a calendaring application is simply used as an example. In some embodiments, the event may be associated with a plurality of attendees who will be sent invitations to the event.

Method 200 may then advance to stage 210 where the computing device may attach content to the event. For example, a document, multimedia file, presentation, recording, etc. may be attached to the calendar event as a downloadable file.

Method 200 may then advance to stage 215 where the computing device may generate a security certificate according to a public key cryptography algorithm. Such a certificate normally comprises a public key and a private key as well as a unique issuer identifier. This certificate may be generated by remote server 130 serving as a cryptographic service. A root certificate associate with remote server 130 may be installed on client device 120, allowing remote server 130 to be authenticated as a valid cryptographic key service. Because the root certificate on client device 120 creates a trusted relationship with remote server 130, applications on the device will accept the generated certificate for use.

Public-key cryptography, also known as asymmetric cryptography, is a class of cryptographic algorithms that requires two separate keys, one of which is secret (or private) and one of which is public. Although different, the two parts of this key pair are mathematically linked. The public key may be used to encrypt data and/or to verify a digital signature; whereas the private key is used to decrypt ciphertext or to create a digital signature.

Public-key algorithms are based on mathematical problems that currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally unfeasible) for a properly generated private key to be determined from its corresponding public key.

Public-key algorithms are fundamental security ingredients in cryptosystems, applications and protocols. They underpin such Internet standards as Transport Layer Security (TLS), PGP, and GPG. Some public key algorithms provide key distribution and secrecy (e.g., Diffie-Hellman key exchange), some provide digital signatures (e.g., Digital Signature Algorithm), and some provide both (e.g., RSA).

A public key infrastructure (PKI) is a set of hardware, software, people, policies, and procedures needed to create, manage, distribute, use, store, and revoke digital certificates. In cryptography, a PKI is an arrangement that binds public keys with respective user identities by means of a certificate authority (CA). The user identity must be unique within each CA domain. The third-party validation authority (VA) can provide this information on behalf of CA. The binding is established through the registration and issuance process, which, depending on the assurance level of the binding, may be carried out by software at a CA or under human supervision. The PKI role that assures this binding is called the registration authority (RA), which ensures that the public key is bound to the individual to which it is assigned in a way that ensures non-repudiation.

After generating the certificate at stage 215, method 200 may advance to stage 220 where the computing device may encrypt the content according to the public key portion of the security certificate. For example, the public key may be transmitted from remote server 130 to client device 120, such as via an application configuration channel that may be used to communicate data across a network. In some embodiments, the computing device, such as client device 120, may need to be verified to be in compliance with compliance rules 142 before the key may be used to encrypt the data.

Method 200 may then advance to stage 225 where the computing device may distribute the content. For example, client device 120 may send calendar invitations to the selected attendees as emails with the encrypted content attached. In some embodiments, the encrypted content may be sent to the remote server 130 to be retrieved by authorized users and/or devices. The event time period during which the content is to be made accessible may also be distributed to the authorized users and/or devices, as may the public key generated at stage 215. Authorized users may similarly encrypt and distribute additional content for use during the same or another event period.

Method 200 may then advance to stage 230 where the computing device may determine whether the event time period has been reached. For example, client device 120 may receive a request from a user to decrypt the document. The client device 120 may then determine whether the current time is within the time period defined by the event. In some embodiments, the agent app 122 may also verify that the client device 120 is in compliance with the compliance rules 142 before permitting the decryption. In some embodiments, the current time may be verified with another source, such as remote server 130, compliance server 140, and/or a public time server rather than relying on the current time according to the client device 120 itself. In some embodiments, the content may be decrypted automatically when the event start time is reached and/or may be decrypted in response to an instruction from remote server 130 and/or compliance server 140.

If the current time is not within the event period, the content will not be decrypted. In some embodiments, an alert that an unauthorized attempt was made to access the content may be transmitted to compliance server 140, the creator of the event, and/or other attendees of the event. Otherwise, method 200 may advance to stage 235 where the computing device may decrypt the content. For example, the private key associated with the security certificate may be distributed to the attendees of the meeting. In some embodiments, the private key may only be sent to those who accepted the meeting invite or who are physically present at a meeting. In some embodiments, the content may be deleted at the conclusion of the event time. Method 200 may then end.

Figure 3:
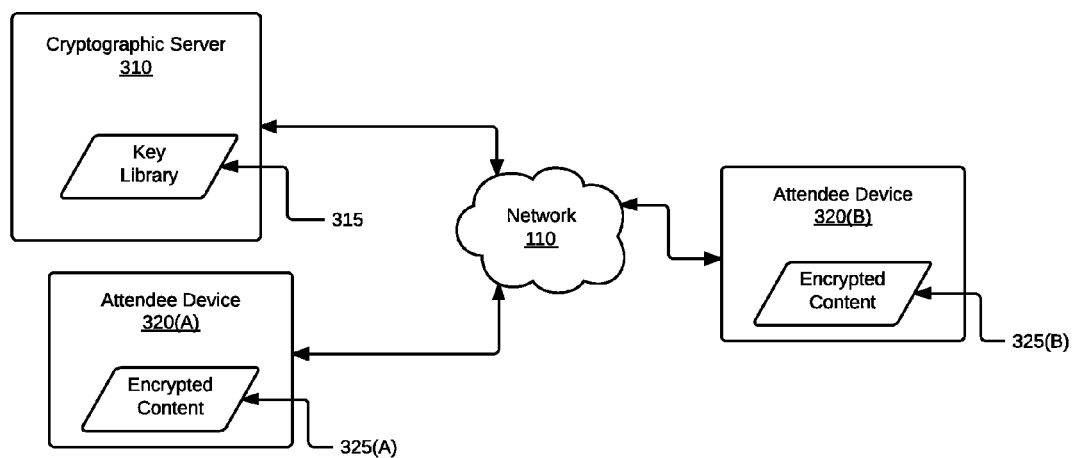
FIG. 3 is a block diagram of a communication system providing a cryptographic proxy server.

FIG. 3 is a block diagram of an example use case deployment 300 providing a cryptographic server 310. Cryptographic server 310 may operate as a certificate authority comprising a key library 315. Communication system 300 may also comprise a plurality of attendee devices 320(A)-(B), each of which may comprise a copy of an encrypted content file 325(A)-(B). In one example embodiment, once the event start time has been reached, compliance server 140 may instruct cryptographic server 310 to release the private key. Cryptographic server 310 may send the private key to attendee devices 320(A)-(B), which may then use it to decrypt encrypted content 325(A)-(B).

In cryptography, a certificate authority (CA) is an entity that issues digital certificates. The digital certificate certifies the ownership of a public key by the named subject of the certificate. This allows others (relying parties) to rely upon signatures or assertions made by the private key that corresponds to the public key that is certified. In this model of trust relationships, a CA is a trusted third party that is trusted by both the subject (owner) of the certificate and the party relying upon the certificate. CAs are characteristic of many public key infrastructure (PKI) schemes.

Figure 4:
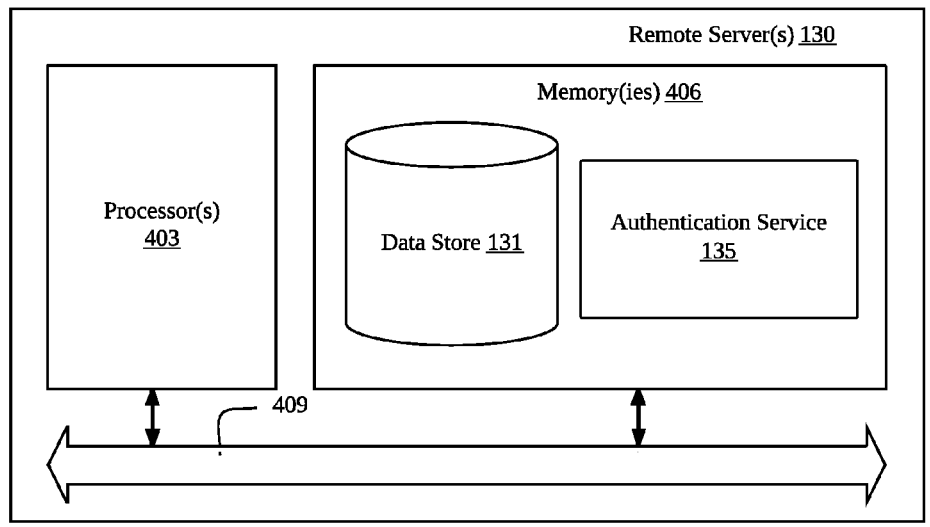
FIG. 4 is a schematic block diagram of a remote server and a client device.
Figure 4:
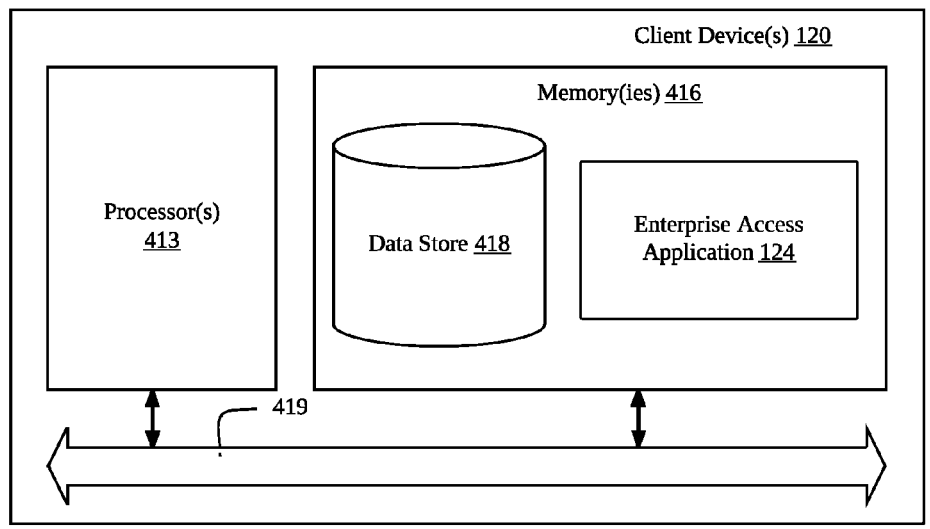

FIG. 4 illustrates schematic block diagram 400 of the remote server 130 and the client device 140 according to embodiments of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc.

Figure 5:
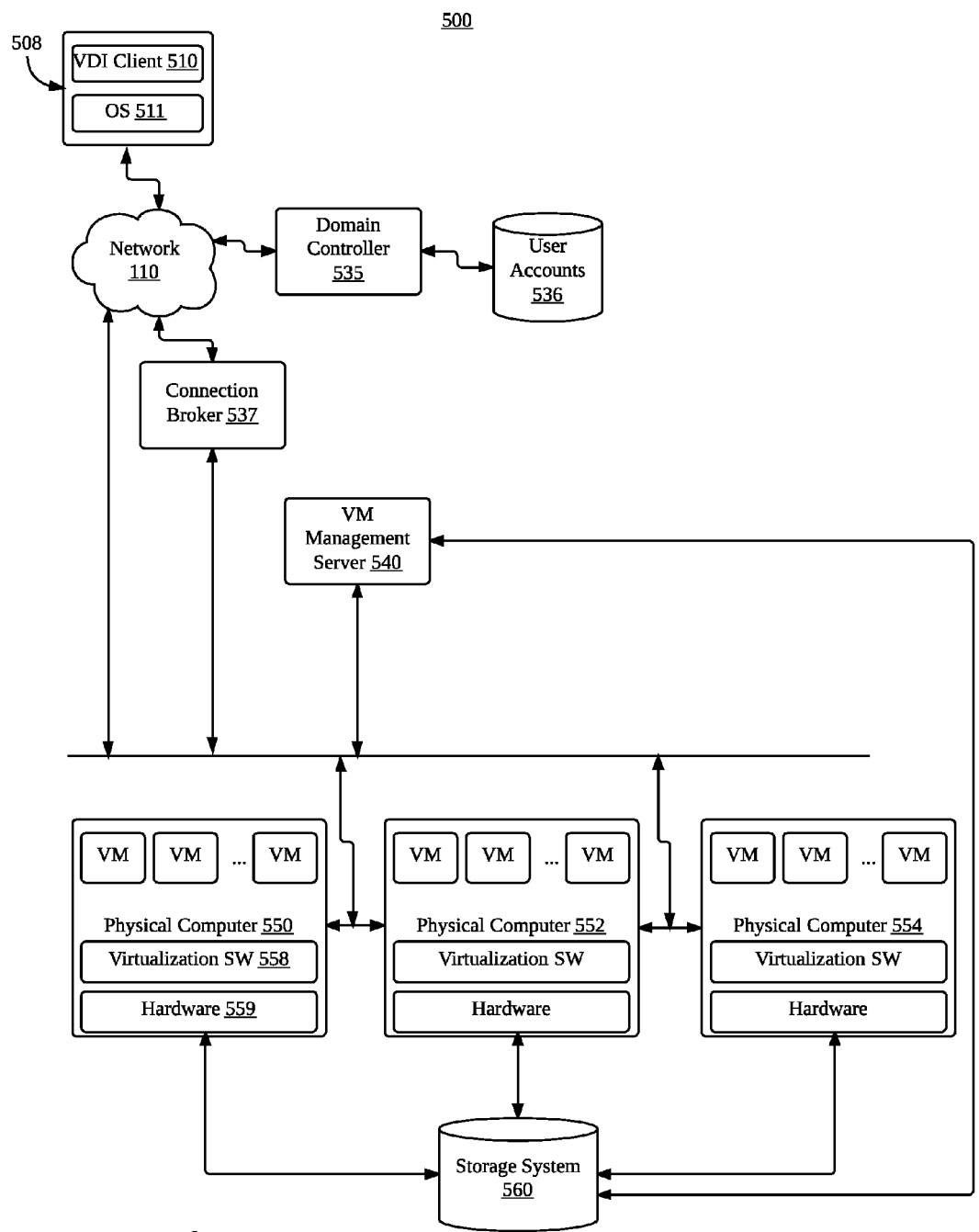
FIG. 5 illustrates components of a virtual desktop infrastructure (VDI) system in which embodiments of the present disclosure may be implemented.

FIG. 5 illustrates components of a virtual desktop infrastructure (VDI) system 500 in which embodiments of the present disclosure may be implemented. In VDI system 500, VDI client software programs such as VDI client 510, run on operating systems of local computing devices, e.g., client machine 508 on top of an operating system (OS) 511. VDI clients provides an interface for the users to access their desktops, which may be running in one of virtual machines 557 or blade server (not shown) in a data center that is remote from the users' locations. The term "desktop" may refer to the instance of an interactive operating environment provided by a computer operating system and software applications, typically in the form of a display and sound output and keyboard and mouse input. With VDI clients, users can access desktops running in a remote data center through network 110, from any location, using a general purpose computer running a commodity operating system and a VDI client software program such as VMware® View, or a special purpose thin client such as those available from Dell, HP, NEC, Sun Microsystems, Wyse, and others.

VDI system 500 may include a domain controller 535, such as Microsoft® Active Directory® that manages user accounts 536 including user log-in information, and a connection broker 537 that manages connections between VDI clients and desktops running in virtual machines 557 or other platforms. Domain controller 535 and connection broker 537 may run on separate servers or in separate virtual machines running on the same server or different servers. In the embodiments of the present disclosure illustrated herein, desktops are running in virtual machines 557 are instantiated on a plurality of physical computers 550, 552, 554, each of which includes virtualization software 558 and hardware 559. Physical computes 550, 552, 554 may be controlled by a virtual machine management server 540, and be coupled to a shared persistent storage system 560.

All of the components of VDI system 500 communicate via network 110. For simplicity, a single network is shown but it should be recognized that, in actual implementations, the components of VDI system 500 may be connected over the same network or different networks. Furthermore, a particular configuration of the virtualized desktop infrastructure is described above and illustrated in FIG. 5, but it should be recognized that one or more embodiments of the present disclosure may be practiced with other configurations of the virtualized desktop infrastructure.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for ensuring security of attachments to calendar events transmitted to a plurality of recipients using e-mail, comprising:
   receiving a request to create a calendar event to be distributed by e-mail, the request including a request to attach at least one document to the calendar event in advance of a time associated with the calendar event;
   generating an encryption key pair;
   encrypting the at least one document according to the encryption key pair;
   establishing an accessible time period associated with the encrypted at least one document, wherein the accessible time period is associated with the calendar event;
   distributing the calendar event, using e-mail and prior to the accessible time period, with an attachment including the encrypted at least one document to a plurality of users;
   prohibiting access to the encrypted at least one document sent using e-mail by the plurality of recipients prior to the accessible time period;
   determining whether a current time falls within the accessible time period; and
   in response to determining that the current time falls within the accessible time period, permitting the encrypted at least one document to be decrypted.

2. The method of claim 1, further comprising:
   distributing a public key of the encryption key pair to at least one of the plurality of users; and
   receiving a second encrypted document from the at least one of the plurality of users, wherein the second encrypted document is encrypted according to the public key of the encryption key pair.

3. The method of claim 1, wherein permitting the encrypted at least one document to be decrypted comprises distributing a private key associated with the encryption key pair to the plurality of users.

4. The method of claim 1, wherein permitting the encrypted at least one document to be decrypted comprises decrypting the encrypted at least one document according to the encryption key pair and distributing the decrypted at least one document to the plurality of users.

5. The method of claim 1, wherein permitting the encrypted at least one document to be decrypted comprises providing the encrypted at least one document to a document viewing app.

6. The method of claim 5, wherein the document viewing app is configured to request decryption of the encrypted at least one document from a compliance server.

7. The method of claim 6, wherein the document viewing app is further configured to provide a plurality of compliance data to the compliance server.

8. The method of claim 7, wherein the plurality of compliance data is associated with a user device executing the document viewing app.

9. The method of claim 1, further comprising:
   evaluating whether a device requesting to decrypt the at least one document during the accessible time period complies with a plurality of a compliance rules associated with an enterprise management mobility system;
   denying access to the at least one document when the device requesting to decrypt the at least one document is not in compliance with the plurality of compliance rules; and
   providing a decryption key to allow the at least one document to be decrypted when the device requesting to decrypt the at least one document complies with the plurality of compliance rules.

10. The method of claim 1, further comprising:
    determining a subset of the plurality of recipients who accepted the calendar invite; and
    providing a decryption key to only the subset of recipients who accepted the calendar invite.

11. A non-transitory computer-readable medium comprising instructions which, when executed by a processor, ensure security of attachments to calendar events transmitted to a plurality of recipients using e-mail, the instructions being configured to:
    receive a request to create a calendar event to be distributed by e-mail, the request including a request to attach at least one document to the calendar event in advance of a time associated with the calendar event;
    generate an encryption key pair;
    encrypt the at least one document according to the encryption key pair;
    establish an accessible time period associated with the encrypted at least one document, wherein the accessible time period is associated with the calendar event;
    distribute the calendar event, using e-mail and prior to the accessible time period, with an attachment including the encrypted at least one document to a plurality of users;
    prohibit access to the encrypted at least one document sent using e-mail by the plurality of recipients prior to the accessible time period;
    determine whether a current time falls within the accessible time period; and
    in response to determining that the current time falls within the accessible time period, permit the encrypted at least one document to be decrypted.

12. The computer-readable medium of claim 11, further comprising instructions configured to:
    distribute a public key of the encryption key pair to at least one of the plurality of users; and
    receive a second encrypted document from the at least one of the plurality of users, wherein the second encrypted document is encrypted according to the public key of the encryption key pair.

13. The computer-readable medium of claim 11, wherein permitting the encrypted at least one document to be decrypted comprises distributing a private key associated with the encryption key pair to the plurality of users.

14. The computer-readable medium of claim 11, wherein permitting the encrypted at least one document to be decrypted comprises decrypting the encrypted at least one document according to the encryption key pair and distributing the decrypted at least one document to the plurality of users.

15. The computer-readable medium of claim 11, further comprising instructions configured to:
    evaluate whether a device requesting to decrypt the at least one document during the accessible time period complies with a plurality of a compliance rules associated with an enterprise management mobility system;
    deny access to the at least one document when the device requesting to decrypt the at least one document is not in compliance with the plurality of compliance rules; and
    provide a decryption key to allow the at least one document to be decrypted when the device requesting to decrypt the at least one document complies with the plurality of compliance rules.

16. The computer-readable medium of claim 11, further comprising instructions configured to:
    determine a subset of the plurality of recipients who accepted the calendar invite; and
    provide a decryption key to only the subset of recipients who accepted the calendar invite.

17. A system for ensuring security of attachments to calendar events transmitted to a plurality of recipients using e-mail, comprising:
    a computing device that receives a request to create a calendar event to be distributed by e-mail, the request including a request to attach at least one document to the calendar event in advance of a time associated with the calendar event; and
    an e-mail server that distributes the calendar event, wherein the computing device and the e-mail server are configured to, individually or together:
    generate an encryption key pair;
    encrypt the at least one document according to the encryption key pair;
    establish an accessible time period associated with the encrypted at least one document, wherein the accessible time period is associated with the calendar event;
    distribute the calendar event, using e-mail and prior to the accessible time period, with an attachment including the encrypted at least one document to a plurality of users;
    prohibit access to the encrypted at least one document sent using e-mail by the plurality of recipients prior to the accessible time period;
    determine whether a current time falls within the accessible time period; and
    in response to determining that the current time falls within the accessible time period, permit the encrypted at least one document to be decrypted.

18. The system of claim 17, wherein permitting the encrypted at least one document to be decrypted comprises distributing a private key associated with the encryption key pair to the plurality of users.

19. The system of claim 17, wherein permitting the encrypted at least one document to be decrypted comprises decrypting the encrypted at least one document according to the encryption key pair and distributing the decrypted at least one document to the plurality of users.

20. The system of claim 17, wherein:
    permitting the encrypted at least one document to be decrypted comprises providing the encrypted at least one document to a document viewing app, the document viewing app being configured to provide a plurality of compliance data to a compliance server, the plurality of compliance data being associated with a user device executing the document viewing app.

* * * * *